United States Patent [19]
Kuslys et al.

[11] Patent Number: 5,993,873
[45] Date of Patent: Nov. 30, 1999

[54] PREPARATION OF A FOOD PRODUCT POWDER PREPARED WITH COMPONENTS INCLUDING MILK POWDER AND LIPIDS

[75] Inventors: Martinas Kuslys, Grosshoechstetten; Theodor Nyfeler, Oberdiessbach; Martin Nydegger, Konolfingen; Niklaus Meister, Grosshoechstetten, all of Switzerland

[73] Assignee: Nestec S.A., Vevey, Switzerland

[21] Appl. No.: 09/098,364

[22] Filed: Jun. 17, 1998

[30] Foreign Application Priority Data

Jul. 10, 1997 [EP] European Pat. Off. ............... 97111697

[51] Int. Cl.⁶ ....................................................... A23C 9/15
[52] U.S. Cl. ........................... 426/285; 426/588; 426/589; 426/594; 426/453; 426/455; 426/456; 426/471
[58] Field of Search ..................... 426/588, 285, 426/453, 602, 443, 455, 456, 465, 471, 594, 589, 591

[56] References Cited

U.S. PATENT DOCUMENTS

| | | | |
|---|---|---|---|
| 2,622,984 | 12/1952 | Peebles et al. | 99/63 |
| 2,911,300 | 11/1959 | Peebles | 99/56 |
| 2,950,204 | 8/1960 | Peebles | 426/285 |
| 3,013,881 | 12/1961 | Carlson | 426/285 |
| 3,053,663 | 9/1962 | Donahue | 426/285 |
| 3,100,909 | 8/1963 | Schapiro | 426/285 |
| 3,120,438 | 2/1964 | McIntire | 426/285 |
| 3,126,283 | 3/1964 | Noznick et al. | 99/55 |
| 3,126,289 | 3/1964 | Spilman | 426/285 |
| 3,164,473 | 1/1965 | Shields | 426/285 |
| 3,231,386 | 1/1966 | Hutton | 426/285 |
| 3,238,045 | 3/1966 | Damisch | 426/285 |
| 3,300,315 | 1/1967 | Nava | 426/285 |
| 3,379,535 | 4/1968 | Landfried | 426/453 |
| 3,458,319 | 7/1969 | Block | 426/285 |
| 3,615,669 | 10/1971 | Hair et al. | 426/453 |
| 3,653,911 | 4/1972 | Mancuso et al. | 426/285 |
| 3,728,127 | 4/1973 | Palmer | 426/96 |
| 3,738,412 | 6/1973 | Nezbed et al. | 159/48.1 |
| 3,752,677 | 8/1973 | Andrews | 426/285 |
| 3,785,831 | 1/1974 | Willock | 426/570 |
| 3,911,143 | 10/1975 | Colmey et al. | 426/583 |
| 3,987,207 | 10/1976 | Spaeti et al. | 426/99 |
| 4,016,337 | 4/1977 | Hsu | 426/99 |
| 4,092,438 | 5/1978 | Tonner | 426/601 |
| 4,239,786 | 12/1980 | Gilmore et al. | 426/601 |
| 4,318,932 | 3/1982 | Ewing et al. | 426/285 |
| 4,415,600 | 11/1983 | Miller et al. | 426/613 |
| 4,438,147 | 3/1984 | Hedrick, Jr. | 426/570 |
| 4,594,258 | 6/1986 | Vitti et al. | 426/594 |
| 4,784,865 | 11/1988 | Baker et al. | 426/250 |
| 4,810,518 | 3/1989 | Haisman et al. | 426/578 |
| 4,855,157 | 8/1989 | Tashiro et al. | 426/609 |
| 5,284,674 | 2/1994 | Fazio | 426/580 |
| 5,370,893 | 12/1994 | Carey | 426/565 |
| 5,370,896 | 12/1994 | Carter et al. | 426/589 |
| 5,451,421 | 9/1995 | Tanihara et al. | 426/589 |
| 5,620,733 | 4/1997 | Chaveron et al. | 426/580 |

FOREIGN PATENT DOCUMENTS

| | | | |
|---|---|---|---|
| 1399650 | 7/1975 | United Kingdom | A23P 1/00 |

*Primary Examiner*—Carolyn Paden
*Attorney, Agent, or Firm*—Vogt & O'Donnell, LLP

[57] ABSTRACT

20 Claims, No Drawings

PREPARATION OF A FOOD PRODUCT POWDER PREPARED WITH COMPONENTS INCLUDING MILK POWDER AND LIPIDS

BACKGROUND OF THE INVENTION

The invention relates to a process for the manufacture of a recombined milk powder, a dietetic formula, a culinary product or a coffee base.

Recombined milk powders are normally manufactured by dissolving all the powdered constituents in water. The oils or the liquid fats are added and the mixture is then homogenized, evaporated and spray-dried. This means that the non-fatty portion of such a product has been dried twice.

The aim of the present invention is to eliminate the second spray-drying because it is very costly. Various attempts have already been made to eliminate the second spray-drying step. U.S. Pat. No. 4,318,932 relates to a process for the manufacture of an instant dried milk, in which an emulsion based on milk cream is prepared and then mixed with a milk powder base in a specific agglomeration chamber. According to this process, it is necessary to carry out a high-pressure homogenisation and for the operation to be carried out in an agglomeration chamber which is specially designed for the process. Moreover, this process does not make it possible to obtain a final powder having a fat content greater than 12%, and it is limited to the use of a lipid phase which is purely of milk origin.

U.S. Pat. No. 2,911,300 also relates to a process for the preparation of recombined milk powder. The basic problem for this process is that the milk powder must first be prepared in a specific manner before preparing the mixture with the lipid phase, which requires a special plant for the agglomeration of the milk powder, and moreover, after mixing with the emulsion, high water contents are reached, which require high energy use for drying.

SUMMARY OF THE INVENTION

The aim of the present invention is to develop a process which can be carried out with conventional plants, without resorting to spray-drying which is considered to be costly in the state of the art and in which the physical parameters of the process are considerably gentle on the product to be manufactured. Moreover, the aim of the invention is also to be able to prepare a recombined powder with a content greater than 15% and which is not limited to a lipid phase which is purely of milk origin. The process according to the invention makes it possible to obtain a powder which, when reconstituted in water, exhibits no rise of fat to the surface and gives good reconstitution characteristics.

The present invention provides a process for the manufacture of a recombined milk powder, a dietetic formula, a culinary product and a coffee base, into which lipids are incorporated by dissolving an emulsifier in water, this solution is mixed with a lipid phase and homogenized so as to form a stable emulsion having a lipid content of between 50 and 70%, a water content of less than 35% and an emulsifier content of between 1 and 5%, the emulsion is mixed with a composition chosen from the group consisting of milk powder, dietetic formula base, powdered soup, powdered sauce and coffee-based powder, and the mixture is dried in order to obtain a powder having a water content of the order of 2 to 5%.

The present invention also provides a product powder which has a lipid content of less than 30%, and the product powder has a wettability of between 6 and 12 seconds which is, as defined herein, the time for 22 g of powder according to the invention to become submerged in 150 g of water at 40° C., as compared to the reference used in the present case, for a normal powder, which gives a submersion time of 40 seconds.

DETAILED DESCRIPTION OF THE INVENTION

In the present invention, milk powder is understood to mean, in the present description, a skimmed milk powder containing milk proteins, carbohydrates, for example milk carbohydrates. It is also possible to use, alone or in the form of a mixture, a milk powder with a reduced fat content, a whey powder, a milk cream, a nonmilk whitener. These base powders may also contain an exogenous carbohydrate such as a mono- or disaccharide, for example a maltodextrine. The milk cream may be a mixture of skimmed milk powder, maltodextrine, whey and caseinate. It is also possible to have a milk cream with one or more of the above-mentioned components. Dietetic formula base is understood to mean the following constituents, taken alone or in the form of a mixture: skimmed milk powder, whey powder, demineralized whey powder, as well as inorganic salts and vitamins. As a specific example of a dietetic formula, there may be mentioned powder for preparing an infant formula. Powdered soup is understood to mean a powder based on starch, milk powder, flavouring, salt, dehydrated vegetable and fat. The powdered sauce has the same composition as the powdered soup, but with a higher starch content. Coffee-based powder is understood to mean a mixture of instant coffee with a carbohydrate, such as maltodextrin and milk powder, whey powders and caseinates.

It is essential according to the invention to prepare the emulsion with a high lipid (one or several) content, with an emulsifier and water. The aim is for the mixture downstream with the milk powder, the dietetic formula base, the powdered soup, the powdered sauce or the coffee-based powder to give a sufficiently low water content, making it possible to envisage drying other than by spray-drying.

For the preparation of the emulsion, it is possible to envisage use of lipids which are either an animal or vegetable fat or an animal or vegetable oil, such as milk fat, palm oil or soya bean oil. If a fat which is solid at room temperature is used, it should be heated so as to mix it with the water-emulsifier combination. In the case of oil, the mixture can be prepared at room temperature.

A milk emulsifier is preferably used, namely potassium or sodium caseinate, skimmed milk powder or sweet butter-milk powder at a content of between 1 and 5%. It is also possible, in the preparation of the emulsion, to add lactose with the base emulsifier, or another carbohydrate.

In the preparation of the emulsion, as already mentioned above, between 50 and 70% of lipid phase, between 1 and 5% of emulsifier and less than 35% of water are used. It is also possible to add an exogenous carbohydrate before the mixing with the lipid phase. It may also be advantageous to carry out lecithination of the emulsion.

The homogenisation of the emulsion is carried out in a colloid mill or in a homogenizer at a maximum pressure of 300 bar. The procedure is preferably carried out with the homogenizer.

It is surprising that a completely stable emulsion can be obtained with such a high fat content and such a weak emulsifier as skimmed milk powder or caseinates. The mean size of the particles in the emulsion is less than 1 micron. The emulsion may be prepared continuously or batch-wise.

If the procedure is carried out continuously, the throughput is adjusted according to the powder/emulsion ratio which is desired in the agglomeration system downstream.

The emulsion thus formed is mixed with the milk powder, the dietetic formula base, the powdered soup, the powdered sauce or the coffee-based powder in a powder/emulsion ratio by weight of between 1:1 and 6:1. This mixing can be carried out directly in a mixer, in a chamber with or without agglomeration tower and also during drying or in a post-dryer. It has been observed that it was preferable for the mixing to be carried out in an agglomeration chamber. The type of agglomeration chamber which can be used is not critical. It is possible to use, for example, an agglomeration chamber with rotating knives, but also a chamber without any moving component. The operation can be carried out both with steam and without steam, preferably without steam.

In the case of the mixing with an agglomeration chamber, the procedure is carried out with a throughput which depends on the size of the chamber.

The drying is carried out either on a fluidized bed, or in an agglomeration tower, or by combining these two techniques.

When the powder is dried to a water content normally between 2 and 4%, a conventional sieving is carried out and the fines are recycled.

The milk powder which is mixed with the emulsion may be skimmed milk powder alone or a mixture or skimmed milk powder and buttermilk powder or powder containing milk powder, whey powder, lactose or other milk ingredients in combination with micronutrients, such as trace elements and vitamins.

In a more specific embodiment, 70% of palm oil is mixed with 27% of water containing 3% of potassium caseinate at a temperature which is slightly greater than 40° C., the mixture is homogenized, 33% of this pre-emulsion is mixed with 44% of skimmed milk and 23% of buttermilk powder in an agglomeration chamber, and the mixture is dried on a fluidized bed so as to arrive at a water content of the powder of the order of 3%.

In the mixture before drying, the water content does not exceed 12% and the lipid content in the final powder is greater than 15%. The lipid content in the final powder is preferably between 15 and 30%.

By carrying out the process according to the invention, it is possible to produce standard milk powders with pieces of equipment which are inexpensive. The reconstitution of these powders in water does not give any apparent formation of a free fat layer at the surface. Only milk-based emulsifiers are used according to the invention, but on the other hand, in the case of the lipid phase, it is possible to introduce therein lipids of nonmilk origin.

If the process according to the invention is carried out with the dietetic formula base, the powdered soup, the powdered sauce and the coffee-based powder, the preparation of the emulsion is carried out as stated above, the emulsifier is the same as above, that is to say, a milk emulsifier. The mixing of the emulsion and of the powder is also carried out in an agglomeration chamber in the same emulsion/powder ratio.

The device for carrying out the process is composed of known components. At the start, the different powders, such as skimmed milk powder and buttermilk powder, are mixed with a commercially available mixer. The metering of the powdered mixture is carried out with a twin-screw metering system, but another system can also be used.

In the case of the preparation of the emulsion, a pump conveys the lipid/water/emulsifier mixture to the colloid mill or the homogenizer.

During the mixing of the emulsion with the powder, the mixing is preferably carried out in an agglomeration chamber. The latter may be of the type with rotatable knives rotating at a speed of between 1700 and 3500 revolutions per minute. The emulsion is injected through a nozzle at a pressure of the order of 5 bar. It is also possible to use an agglomeration chamber without any moving part. These different agglomeration chambers are known in the art, and as already mentioned above, it is possible to carry out a lecithination during the agglomeration or later.

The mixture is preferably dried in a fluidized bed system, for example with a vibrating fluidized bed system, or according to any other known drying technique.

EXAMPLES

The remainder of the description provides examples.

Example 1

3 kg of skimmed milk powder are dissolved in 27 kg of water over about 5 minutes. The temperature of the water should be greater than the melting temperature of palm oil, namely 40° C. 70 kg of liquid palm oil is slowly added to the preceding stirred solution so as to form a pre-emulsion with large fat globules. The mixture is pumped through the homogenizer and the pressure is slowly increased to 200 bar.

The emulsion is ready to be injected into the agglomeration chamber. The operation is carried out so as to have a throughput of 200 kg/h of base powder (comprising 35% of buttermilk powder for 65% of skimmed milk powder) and 80 kg/h of emulsion are simultaneously injected. The drying is carried out with a fluidized bed operating at a temperature of 80° C.

A powder is obtained which has a water content of 4.39% and a fat content of 21.9%. The specific gravity of the powder is 500 g/l. During reconstitution in water, there is no visible rise of fat to the surface.

Example 2

The operation is carried out as in the preceding example, but instead of using skimmed milk powder as emulsifier, potassium caseinate is used. 5 kg of potassium caseinate and 10 kg of lactose are dissolved in 30 kg of water, with stirring over 5 minutes. This solution is mixed with 55 kg of liquefied palm oil and the mixture is homogenized as above.

The operation is carried out so as to have a throughput of 200 kg/h of base powder (comprising 35% of buttermilk powder for 65% of skimmed milk powder) and 100 kg/h of emulsion are simultaneously injected. The drying is carried out in a fluidized bed at a temperature of 80° C.

A powder having a moisture content of 2.8%, a lipid content of 20% and a specific gravity of 500 g/l is obtained. During reconstitution in water, there is no visible rise of fat to the surface.

Example 3

3 kg of potassium caseinate are dissolved in 27 kg of water and 70 kg of maize oil and of butter oil (ratio 4:1) are slowly added to the preceding stirred solution and the mixture is homogenized as above.

A powdered mixture, comprising 64 kg of demineralized whey powder, 9 kg of skimmed milk powder, 11 kg of lactose and 2 kg of potassium caseinate, is prepared separately. An agglomeration is then carried out in the same device as for the preceding examples with a throughput of powder of 200 kg/h and of emulsion of 110 kg/h.

Example 4

5 kg of potassium caseinate and 10 kg of lactose are dissolved in 30 kg of water, while stirring over 5 minutes, and 55 kg of maize oil and of butter oil (ratio 4:1) are slowly added to the preceding stirred solution and the mixture is homogenized as above.

A powdered mixture, comprising 120 kg of skimmed milk powder, 90 kg of lactose and 0.9 kg of micronutrients (mixture of vitamins and of trace elements), is prepared separately. An agglomeration is then carried out using a system with fixed components. The emulsion is thus sprayed towards the periphery of the system in a falling powder curtain with a throughput of powder of 200 kg/h and of emulsion of 150 kg/h.

We claim:

1. A process for preparing a food product powder composition comprising:
   dissolving an emulsifier in water for obtaining an aqueous composition which comprises the emulsifier in solution, adding lipids to the aqueous composition to obtain a lipid-added aqueous composition so that, by weight, the lipid-added composition comprises the lipids in an amount of from 50% to 70%, the water in an amount of less than 35% and the emulsifier in an amount of from 1% to 5% and homogenizing the lipid-added composition to obtain an emulsion;
   mixing with the emulsion a powder composition which comprises a milk powder and which is selected from the group consisting of a milk powder, of a dietetic formula base, of a powdered soup base, of a powdered sauce base and of a coffee-based powder to obtain a mixture; and
   drying the mixture to obtain a dried product having a moisture content on the order of from 2% to 5%.

2. A process according to claim 1 wherein the emulsifier comprises a member selected from the group consisting of skimmed milk powder, sweet buttermilk powder, potassium caseinate and sodium caseinate.

3. A process according to claim 1 wherein the emulsifier comprises skimmed milk powder.

4. A process according to claim 1 wherein the emulsifier comprises potassium caseinate.

5. A process according to claim 1 wherein the composition which comprises a milk powder is a milk powder and is selected from the group consisting of skimmed milk powder, buttermilk powder and whey powder.

6. A process according to claim 1 wherein the composition which comprises a milk powder is a mixture of skimmed milk powder and buttermilk powder.

7. A process according to claim 1 wherein the lipids are selected from the group consisting of animal fats and oils and vegetable fats and oils.

8. A process according to claim 1 wherein the lipids comprise a composition is selected from the group consisting of milk fat, palm oil and soya bean oil.

9. A process according to claim 1 wherein the powder composition and the emulsion are mixed in amounts so that, by weight, the dried product has a lipid content greater than 15%.

10. A process according to claim 1 wherein the powder composition and the emulsion are mixed in amounts so that, by weight, the dried product has a lipid content which is, greater than 15% and less than 30%.

11. The dried product of the process of claim 10.

12. A process according to claim 1 wherein the drying is carried out by a drying process selected from the group consisting of fluidized bed drying and agglomeration tower drying.

13. A process according to claim 12 wherein the mixture which comprises agglomerates is dried by fluidized bed drying.

14. A process according to claim 13 wherein the lipids comprise palm oil, the emulsifier comprises potassium caseinate and wherein, by weight, the emulsion comprises the palm oil in an amount of 70%, the water in an amount of 27% and the potassium caseinate in an amount of 3% and wherein the emulsion is mixed with skimmed milk powder and buttermilk powder so that, by weight, the mixture obtained comprises the emulsion in an amount of 33%, the skimmed milk powder in an amount of 44% and the buttermilk powder in an amount of 23% and wherein the mixture is dried so that the dried product has a water content on the order of 3%.

15. A process according to claim 1 wherein the mixing is carried out so that the mixture obtained comprises agglomerates.

16. A process according to claim 15 wherein the powder composition and emulsion are mixed and agglomerated in a ratio by weight of powder to emulsion of between 1:1 to 6:1.

17. A process according to claim 1 wherein the lipid-added composition is homogenized at a pressure not greater than 300 bar.

18. The dried product of the product of the process of claim 17.

19. A process according to claim 1 wherein the lipid-added composition is homogenized in a coloid mill.

20. The dried product of the process of claim 1 wherein the dried product has, by weight, lipids in an amount of from greater than 15% and up to 30% and a wettability of between 6 seconds and 12 seconds.

* * * * *

UNITED STATES PATENT AND TRADEMARK OFFICE
CERTIFICATE OF CORRECTION

PATENT NO. : 5,993,873
DATED : November 30, 1999
INVENTOR(S) : Martinas KUSLYS, et al.

It is certified that error appears in the above-identified patent and that said Letters Patent is hereby corrected as shown below:

On the title page item [57], under the heading "ABSTRACT", insert the following disclosure:

-- A food product powder composition is prepared by dissolving an emulsifier in water, lipids are added to that aqueous composition, which includes the emulsifier in solution, and the lipid-added composition is homogenized to form an emulsion, the emulsion is mixed with a milk powder-containing composition, including a milk powder or dietetic formula base or powdered sauce base or coffee-based powder to obtain a mixture, and then, the mixture is dried to a water content on the order of from 2% to 5%. --. .

Column 1, line 45, change "with a content" to -- with a lipid content -- (i.e., insert "lipid").

Signed and Sealed this

Twenty-sixth Day of September, 2000

*Attest:*

Q. TODD DICKINSON

*Attesting Officer*  *Director of Patents and Trademarks*